C. J. LINDBECK.
COOKING AND HEATING STOVE.
APPLICATION FILED JAN. 26, 1921.
1,413,040.
Patented Apr. 18, 1922.
3 SHEETS—SHEET 1.
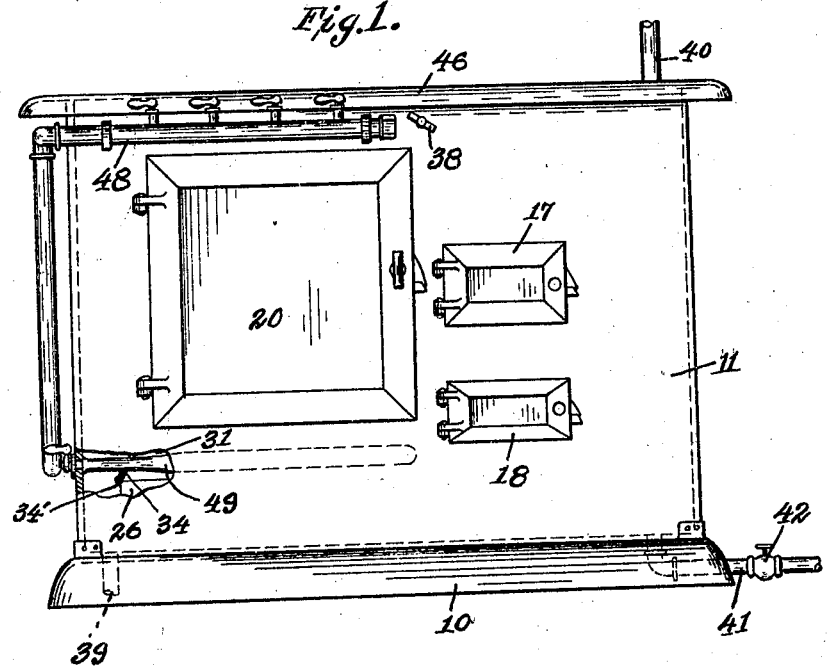
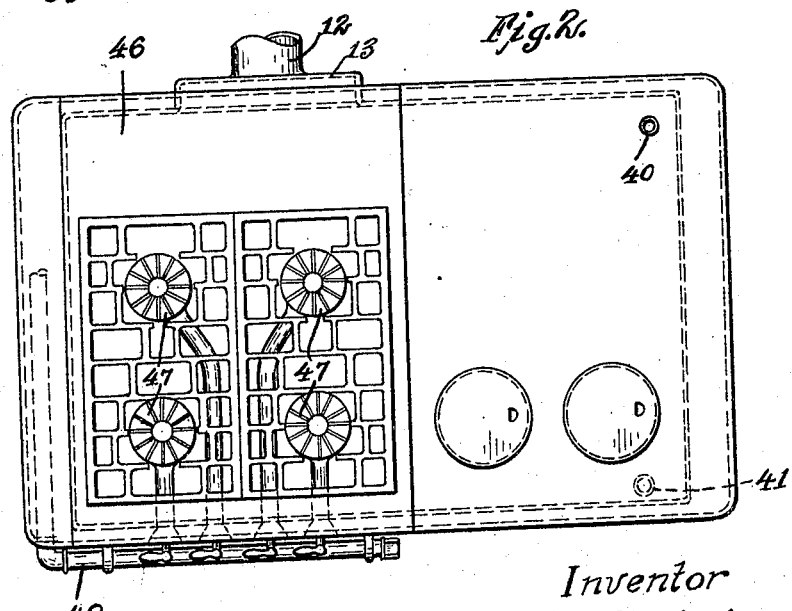
Inventor
Carl J. Lindbeck
by Jones, Addington, Ames & Seibold
Attys.

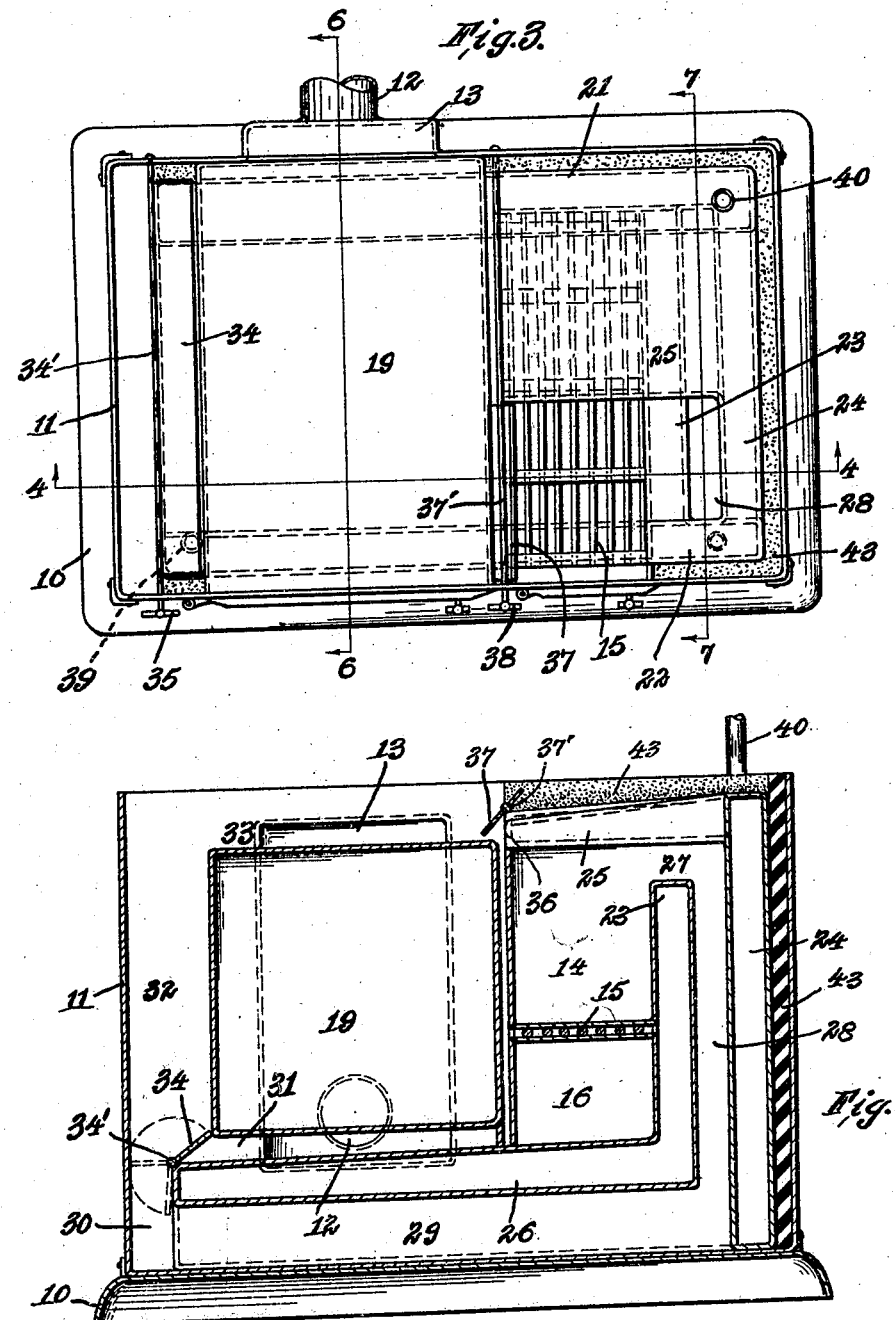

C. J. LINDBECK.
COOKING AND HEATING STOVE.
APPLICATION FILED JAN. 26, 1921.
1,413,040.
Patented Apr. 18, 1922.
3 SHEETS—SHEET 3.
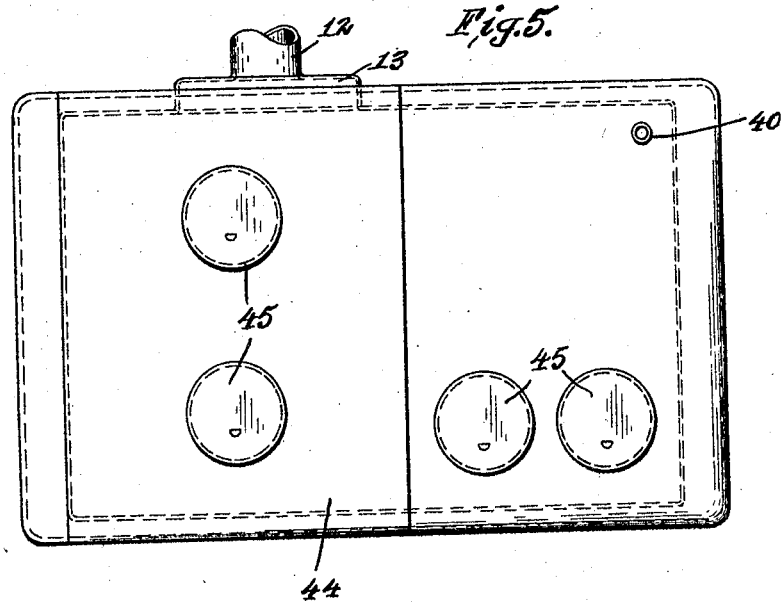
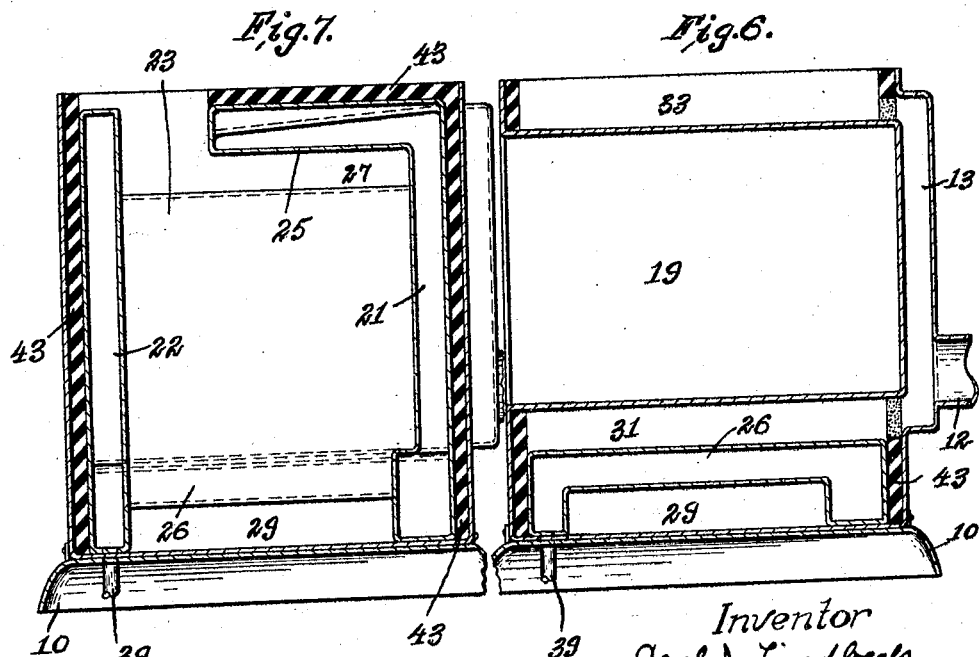

UNITED STATES PATENT OFFICE.

CARL J. LINDBECK, OF CHICAGO, ILLINOIS.

COOKING AND HEATING STOVE.

1,413,040.  Specification of Letters Patent.  Patented Apr. 18, 1922.

Application filed January 26, 1921. Serial No. 439,950.

*To all whom it may concern:*

Be it known that I, CARL J. LINDBECK, a subject of the King of Sweden, (who has declared his intention of becoming a citizen of the United States,) residing at Chicago, in the county of Cook and State of Illinois, have invented new and useful Improvements in Cooking and Heating Stoves, of which the following is a full, clear, concise, and exact description, reference being had to the accompanying drawing, forming a part of this specification.

My invention relates to improvements in stoves designed to serve for purposes of cooking as well as heating.

The object of my invention is the production of a stove of this character through the medium of which maximum utilization of heat will be effected.

A further object is the production of a stove capable of serving in the double capacity mentioned, namely, that of cooking and heating, which will be confined to small space and which will be highly efficient in operation.

A still further object is the production of a stove of the character mentioned wherein provision is made for effectually regulating the flow of hot gases emanating from the fire box whereby the stove is rendered capable of efficiently serving under varying conditions.

A still further object is the production of a stove as mentioned which will be of durable and economical construction and not susceptible to readily becoming inoperative.

Other objects will appear hereinafter.

With these objects in view, the invention consists of the combinations and arrangements of parts hereinafter described and claimed.

The invention will be more readily understood by reference to the accompanying drawings in which—

Fig. 1 is a front elevation of a stove embodying the invention;

Fig. 2 is a top plan view of the construction seen in Fig. 1;

Fig. 3 is a top plan view of the stove with the top plate thereof removed;

Fig. 4 is a section taken on substantially line 4—4 of Fig. 3;

Fig. 5 is a view similar to Fig. 2 showing another form of top plate which may be used; and Figs. 6 and 7 are sections taken on substantially lines 6—6 and 7—7 of Fig. 3.

The preferred form of construction, as illustrated in the drawings, comprises a base 10 of suitable design upon which is mounted the body of the stove. This consists of an outer wall or casing 11 provided at its rearward side with a smoke outlet or flue 12 which leads from a vertical chamber 13 formed in the rear wall of the stove, as clearly seen in Figs. 4 and 6.

Within the casing 11 is provided a fire box 14 having a grate 15 below which is provided the ash pit 16. Access to said fire box and ash pit may be gained through doors 17 and 18 respectively. Within casing 11 is also provided an oven 19 which is accessible through a suitable door 20.

Defining said fire box and ash pit and the smoke passage which leads from the former, is a hollow water circulating unit comprising a rear vertical longitudinal portion 21 and a front vertical longitudinal portion 22, as clearly seen in Figs. 3 and 7. Extending between and connecting the portions 21 and 22 are spaced vertical transverse portions 23 and 24. Spaced above the fire box is a horizontal portion 25 of the water circulating unit, said portion 25 being in open communication with the vertical unit portions 21 and 24. The horizontal portion 25 extends only partway over the fire box, a space being left at the front edge thereof, as clearly seen in Fig. 7 for the escape of smoke and gases emanating from the fire box, as will be hereinafter more fully described.

Connected with all of the vertical portions of the water circulating unit, that is, the portions 21, 22, 23 and 24, is a lower horizontal portion 26 which extends under the fire box and oven, as clearly seen in Fig. 4.

The vertical portion 23 of said unit is spaced below the horizontal portion 25 so as to leave a laterally extending passageway 27 leading from the fire box, as clearly seen in Fig. 4. The passageway 27 communicates with the upper end of vertical passage 28 which is formed between the unit portions 23 and 24, the lower end of passage 28 communicating with a horizontal passageway 29 which is formed through transverse arching of the unit portion 26, as clearly seen in Figs. 4 and 6. The passage 29 communicates with a vertical passage 30 which is formed between the left hand end of the horizontal unit portion 26 and the adjacent vertical wall of the stove.

From the vertical passage 30 leads a horizontal passage 31 which extends back under the oven 19 and into communication with the outlet chamber 13. Also leading from the vertical passage 30 is a branch continuation 32 which leads past one side of oven 19 to a horizontal passage 33 which is provided above said oven and which leads to the upper end of the outlet chamber 13.

Thus, with the construction set forth, it will be seen that the water circulating unit defines the fire box and ash pit of the stove and in addition thereto a passage for the products of combustion emanating from the fire box, the passage thus formed comprising the portions 27, 28, 29 and 30 whence branch passages are provided, one of which leads under the oven and the other over the same.

Communication of vertical passage 30 with branch passages 31 and 32 is controlled by a damper 34 pivotally mounted at 34' and provided with an exteriorly positioned handle 35 whereby the same may be manually adjusted. Said damper is so positioned that when the same is in its full line position, as seen in Fig. 4, the passage 31 will be cut off, making it necessary for the gases passing said damper to flow into the passage 33 over the oven and thence into the outlet chamber 13. When said damper is in depending or vertical position, as seen in dotted lines in Fig. 4, both passages 31 and 32 will be open so that gases flowing past said damper will divide at this point, the majority of the same passing through the passage 31 to the outlet and the remainder passing into passage 32, as before described. The majority of gases will flow into the passage 31, as mentioned, because of the positioning of the outlet 12 close to the lower end of chamber 13, it being clear that with this positioning of said outlet, the shortest course for the gases on passing said damper will be through the passage 31. When said damper is in the horizontal position as shown by dotted lines in Fig. 4, passage 30 will be closed and hence the flow of gases therethrough shut off altogether. With this arrangement, it will be seen that provision is made for controlling heating of the oven so as to render the same better adapted for cooking or baking of various kinds. It will be seen that with said damper 34 positioned as seen in full lines in Fig. 3 so as to direct the hot gases to one side of and over the top of the oven, the latter will be less intensely heated than when said damper is in the vertical dotted line position shown in Fig. 4, when the hot gases will be directed under as well as around and over the oven.

A second outlet 36 leads from the fire box 14 which communicates with the passage 33 provided above the oven. Said outlet or second passage is controlled by a damper 37 pivoted at 37' and operable through the medium of an exteriorly positioned handle 38. The outlet 36 is positioned at the left hand side of the fire box and between the front edge of the horizontal portion 25 of the water circulating unit and the front wall of the stove. Said second outlet is utilized particularly when the damper 34 is in closed position. In the latter case, the damper 37 will be open so as to permit of the flow of gases from the fire box through the outlet 36 over the oven and into the outlet chamber 13. This, of course, is a short cut for the gases and affords another adjustment for varying the heating of the oven to adapt the same for varying uses or varying conditions.

With the construction set forth then it will be seen that an arrangement is provided in which, when in operation, the oven will be heated for cooking or baking purposes and in which at the same time the water circulating unit will also be heated to heat the water circulating therethrough. Such water is introduced into said unit through an inlet pipe 39 which communicates with the bottom of said unit at one corner of the stove. An outlet pipe 40 leads from the top of said unit at the diametrically opposite corner of the stove so that the water entering said unit will be required to pass completely through the same and thus be thoroughly heated before the same passes therethrough. In use, the water which passes from the water circulating unit into the pipe 40 will be directed to hot water radiators or other heating devices and thence back through the pipe 39 for reheating. A drain pipe 41 provided with a suitable valve 42 is also connected with the water circulating unit whereby the water may be readily drained therefrom.

The interior of the outer wall or casing 11 of the stove will be suitably lined with a layer 43 of heat insulating material to prevent wastage of heat by conduction or radiation. The top 44 of the stove may be of the construction seen in Fig. 5 in which lids 45 are provided, or a plate of the construction seen at 46 in Figs. 1 and 2 may be provided wherein gas burners 47 are used. The gas burners 47 will be connected by a pipe 48 with a source of gas supply, a gas range being thus provided permitting of cooking on the top of the stove without the use of a fire in the fire box. Where gas is used, a burner 49 may also be arranged in the passage 31 under the oven, as seen in Fig. 1, which will permit of heating of the oven by gas.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having thus described my invention, what I claim as new and desire to secure by Letters Patent is:

1. A stove comprising a fire box; a smoke outlet; an oven; a passage leading from said fire box to said outlet; a hollow water circulating unit defining said fire box and passage, the passage defined by said unit extending upwardly from said fire box, then laterally, then downwardly, then horizontally below said fire box and oven; two continuations of said passage, one leading under said oven and the other leading past one side of said oven and over the same; and means for causing the gases passing through said passage to flow into either one or both of said continuations.

2. A stove comprising a fire box; a smoke outlet; an oven; a passage leading from said fire box to said outlet; a water circulating unit defining said fire box and passage, said unit comprising longitudinal and transverse vertical portions forming respectively the rear wall and one side wall of said fire box; a second transverse portion spaced from and parallel with said first mentioned transverse portion forming a vertical passage between the same; a horizontal portion positioned above said fire box and spaced from the upper edge of said first mentioned transverse portion to form a passage thereover communicating with said vertical passage, said horizontal portion being in open communication with said longitudinal and second transverse portions of said unit, the rearward edges of said transverse portions being in open communication with said longitudinal vertical portion; a front longitudinal vertical portion establishing communication between the front edges of said transverse portions; and a horizontal portion positioned below said fire box and oven and in open communication with all of said vertical portions, said last mentioned horizontal portion being arched to form a horizontal passage which communicates with said vertical passage, all of said unit portions being hollow.

3. A stove comprising a fire box; a smoke outlet; an oven; a passage leading from said fire box to said outlet; a water circulating unit defining said fire box and passage, said unit comprising longitudinal and transverse vertical portions forming respectively the rear wall and one side wall of said fire box; a second transverse portion spaced from and parallel with said first mentioned transverse portion forming a vertical passage between the same; a horizontal portion positioned above said fire box and spaced from the upper edge of said first mentioned transverse portion to form a passage thereover communicating with said vertical passage, said horizontal portion being in open communication with said longitudinal and second transverse portions of said unit, the rearward edges of said transverse portions being in open communication with said longitudinal portion; a front longitudinal vertical portion establishing communication between the front edges of said transverse portions; a horizontal portion positioned below said fire box and oven and in open communication with all of said vertical portions, said last mentioned horizontal portion being arched to form a horizontal passage which communicates with said vertical passage, all of said unit portions being hollow; and a continuation of said horizontal passage leading therefrom around said oven to said outlet.

4. A stove comprising a fire box; a smoke outlet; an oven; a passage leading from said fire box to said outlet; a water circulating fire box and passage, said unit defining said fire box and passage, said unit comprising longitudinal and transverse vertical portions forming respectively the rear wall and one side wall of said fire box; a second transverse portion spaced from and parallel with said first mentioned transverse portion forming a vertical passage between the same; a horizontal portion positioned above said fire box and spaced from the upper edge of said first mentioned transverse portion to form a passage thereover communicating with said vertical passage, said horizontal portion being in open communication with said longitudinal and second transverse portions of said unit, the rearward edges of said transverse portions being in open communication with said longitudinal portion; a front longitudinal vertical portion establishing communication between the front edges of said transverse portions; a horizontal portion positioned below said fire box and oven and in open communication with all of said vertical portions, said last mentioned horizontal portion being arched to form a horizontal passage which communicates with said vertical passage, all of said unit portions being hollow; a continuation of said horizontal passage leading therefrom around said oven to said outlet; and another passage leading from said fire box and over said oven to said outlet.

In witness whereof, I have hereunto subscribed my name.

CARL J. LINDBECK.

Witnesses:
 DAVID I. SWANSON,
 ARTHUR A. OLSON.